United States Patent
Burczyk et al.

(10) Patent No.: US 10,532,717 B2
(45) Date of Patent: Jan. 14, 2020

(54) AIRBAG AND VEHICLE

(71) Applicant: DAIMLER AG, Stuttgart (DE)

(72) Inventors: Christian Burczyk, Stuttgart (DE); Till Heinrich, Stuttgart (DE); Bengt Larsson, Sindelfingen (DE)

(73) Assignee: DAIMLER AG, Stuttgart (DE)

( * ) Notice: Subject to any disclaimer, the term of this patent is extended or adjusted under 35 U.S.C. 154(b) by 224 days.

(21) Appl. No.: 15/566,325

(22) PCT Filed: Apr. 14, 2016

(86) PCT No.: PCT/EP2016/000610
§ 371 (c)(1),
(2) Date: Oct. 13, 2017

(87) PCT Pub. No.: WO2016/165826
PCT Pub. Date: Oct. 20, 2016

(65) Prior Publication Data
US 2018/0105132 A1 Apr. 19, 2018

(30) Foreign Application Priority Data
Apr. 16, 2015 (DE) .................. 10 2015 004 892

(51) Int. Cl.
*B60R 21/233* (2006.01)
*B60R 21/2338* (2011.01)

(52) U.S. Cl.
CPC .. *B60R 21/233* (2013.01); *B60R 2021/23308* (2013.01); *B60R 2021/23382* (2013.01)

(58) Field of Classification Search
CPC .......................... B60R 21/233; B60R 21/207
See application file for complete search history.

(56) References Cited

U.S. PATENT DOCUMENTS 5,997,037 A * 12/1999 Hill ...................... B60R 21/201
280/728.1
6,086,092 A * 7/2000 Hill ...................... B60R 21/233
280/729

(Continued)

FOREIGN PATENT DOCUMENTS

| CN | 1655968 A | 8/2005 |
| CN | 1720156 A | 1/2006 |

(Continued)

OTHER PUBLICATIONS

International Search Report dated Jul. 14, 2016 in related International Application No. PCT/EP2016/000610.

(Continued)

*Primary Examiner* — Nicole T Verley
(74) *Attorney, Agent, or Firm* — Patent Portfolio Builders PLLC

(57) ABSTRACT

A vehicle airbag includes at least one chamber configured to be inflated when the airbag is triggered and at least one gas generator fluidically connected to the at least one chamber for filling the at least one chamber with a gas. At least one respective interior tensioning bag is arranged in the at least one chamber at each opposing chamber end. The two tensioning bags are configured in such a way that during the filling of the at least one chamber, they synchronously tension and deploy the chamber.

8 Claims, 5 Drawing Sheets

(56) References Cited

U.S. PATENT DOCUMENTS

Figure 1:
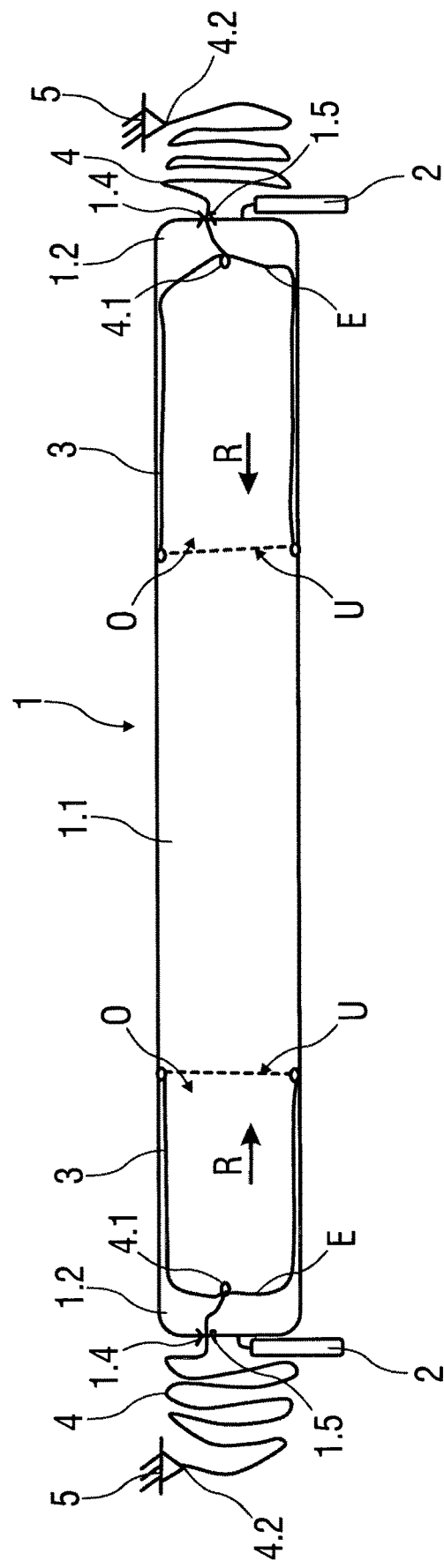

| | | | | |
|---|---|---|---|---|
| 6,308,983 | B1* | 10/2001 | Sinnhuber | B60R 21/233 280/735 |
| 6,422,593 | B1* | 7/2002 | Ryan | B60R 21/232 280/730.2 |
| 7,048,300 | B2* | 5/2006 | Honda | B60R 21/23138 280/730.2 |
| 7,380,822 | B2* | 6/2008 | Abe | B60R 21/233 280/743.1 |
| 7,503,582 | B2 | 3/2009 | Sendelbach et al. | |
| 7,594,677 | B2 | 9/2009 | Sendelbach et al. | |
| 7,731,232 | B2* | 6/2010 | Higuchi | B60R 21/233 280/729 |
| 8,690,185 | B2* | 4/2014 | Yamaji | B60R 21/233 280/729 |
| 9,027,956 | B2* | 5/2015 | Yamaji | B60R 21/203 280/729 |
| 9,199,601 | B2* | 12/2015 | Yamaji | B60R 21/239 |
| 9,409,542 | B2* | 8/2016 | Fujiwara | B60R 21/23138 |
| 9,457,759 | B2* | 10/2016 | Sugimoto | B60R 21/23138 |
| 9,604,556 | B2* | 3/2017 | Fukawatase | B60R 21/207 |
| 9,796,354 | B1* | 10/2017 | Hayashi | B60R 21/239 |
| 9,956,937 | B2* | 5/2018 | Jindal | B60R 21/231 |
| 10,279,769 | B2* | 5/2019 | Nakanishi | B60R 21/203 |
| 2011/0298201 | A1* | 12/2011 | Kobayashi | B60R 21/207 280/736 |
| 2014/0375032 | A1* | 12/2014 | Fukawatase | B60R 21/239 280/729 |
| 2017/0088080 | A1* | 3/2017 | Hotta | B60R 21/2338 |

FOREIGN PATENT DOCUMENTS

| | | |
|---|---|---|
| DE | 10322736 A1 | 12/2004 |
| EP | 2666678 A1 | 11/2013 |

OTHER PUBLICATIONS

Written Opinion dated Jul. 14, 2016 in related International Application No. PCT/EP2016/000610.

Office Action dated Dec. 5, 2018 in related/corresponding CN Application No. 201680021694.4 (All references from Office Action not cited herewith have previously been made of record).

* cited by examiner

AIRBAG AND VEHICLE

BACKGROUND AND SUMMARY OF THE INVENTION

Exemplary embodiments of the invention relate to an airbag for a vehicle and a vehicle comprising at least one such airbag.

Airbags for vehicles are known in general from the prior art. Such airbags cover different areas inside or outside the vehicle and reduce the risk of an impact of vehicle occupants or other travelers against the covered areas of the vehicle. An airbag comprises at least one inflatable chamber, which in the event of a triggering is filled with a gas using a fluid-coupled gas generator. As the at least one chamber is being filled, the airbag deploys from a non-use position into a use position.

Exemplary embodiments are directed to an airbag that is improved over the prior art and an improved vehicle.

The airbag for a vehicle comprises at least one chamber that can be inflated when the airbag is triggered and at least one gas chamber fluidically connected to the at least one chamber for filling the at least one chamber with a gas. According to the invention, at least one respective inner tensioning bag is arranged at each opposite chamber end in the at least one chamber, wherein the two tensioning bags are configured in such a way that as the at least one chamber is being filled, these bags expand and tension in a synchronized manner and deploy the chamber.

Long tensioning or expansion paths in airbags with large surface areas, such as airbags or safety cloths or safety nets or protective nets serving as dividing elements or partitions in the vehicle interior, are avoided by an airbag configured in this manner. Furthermore, the entire chamber is not filled with gas. During the gas or pressure filling of the airbag, the internal tensioning bags in the chamber are inflated and thus everted or evaginated in the axial direction toward the chamber middle and thereby support the chamber in the everted and inflated state from inside. In other words, the airbag comprises an outer airbag, which forms the chamber, and a plurality of inner tensioning bags, which are also configured as airbags (also known as a tube-in-tube airbag). The inner tensioning bags can thus be tensioned like a muscle during the filling of the chamber and hence of the outer airbag, whereby the outer airbag and hence the chamber are moved, in particular deployed and tensioned.

In one possible embodiment, at least one respective inner tensioning bag is arranged at each opposite chamber end in the at least one chamber, wherein in the unfilled state of the chamber, the respective tensioning bag is invaginated in a starting position in the chamber, in particular toward a portion of the chamber containing a gas flow. Particularly in the event of triggering, the chamber can then be filled with a gas in such a way that the respective tensioning bag, which is invaginated when in the starting position, is evaginated from the starting position into a tensioning position inside the chamber after filling. As a consequence, the chamber and thus the airbag are deployed and tensioned.

According to another embodiment at least one associated tensioning element per tensioning bag is guided through a passage opening from an exterior of the chamber into an interior of the chamber and is fastened at a bag end opposite a bag opening of the invaginated tensioning bag, and wherein the chamber can be filled at the chamber ends with the gas in such a way that the respective tensioning bag, which is invaginated in the starting position, is evaginated from the respective chamber portion from the starting position into an tensioning position after filling, wherein the associated tensioning elements tension the tensioning bags through the respective passage opening in opposing tensioning directions.

By means of the airbag with interior tensioning bags capable of being evaginated and inflated, a displacement and thus a tensioning function of the tensioning element can be effected in addition to a cushioning function resulting from the inflation for reducing the risk of injury or for tensioning a dividing element or occupant protection element. A length of the displacement thus corresponds to a length of the invaginated tensioning bag in the chamber, in the starting position. The displacement of the tensioning element and thus the tensioning force can be adjusted in an expedient manner by selecting the length of the chamber and the length of the invaginated tensioning bag.

Depending on the type and size of the airbag, the tensioning bags can be configured and integrated in the chamber in such a way that, in the evaginated state and thus in the filled state of the chamber, they are disposed adjacently to one another therein. For example, an elongate, in particular tube-shaped airbag is thus filled with gas from two ends. In particular, the interior and invaginated tensioning bags are filled synchronously with the gas from opposite ends so that the tensioning bags are evaginated and deployed in such a way that their bag ends move toward one other and are adjacent to one another in the filled state of the chamber. Even a large elongate airbag can thus be filled quickly and easily.

In an alternative embodiment, the tensioning bags are configured and integrated in the chamber in such a way that, in the evaginated state and thus in the filled state of the chamber, they lie on top of one another therein. For example, a tall and less elongate airbag is thus filled with gas from two ends. In particular, the interior and invaginated tensioning bags are filled synchronously with the gas from opposite ends so that the tensioning bags are evaginated and deployed in such a way that their bag ends move toward and past one another and are arranged at chamber ends opposite each other in the filled state of the chamber. In the filled state of the chamber, the evaginated tensioning bags are thus disposed in parallel above one another. Even a large tall or wide airbag can thus be filled quickly and easily.

In particular for reducing the required gas volume, the respective tensioning bag is fastened to the chamber and fluidically connected to the chamber by a peripheral seam. The respective tensioning bag is fluidically connected to the chamber portion, which is fluidically connected to the gas generator. The tensioning element is thus guided via a passage opening into the chamber, and connected to the invaginated bag end in the interior of the chamber.

Depending upon the nature of the arrangement of the gas generator and the gas infeed, in an alternative embodiment the respective tensioning element can be arranged between the gas generator and the chamber in a fluid-tight sheath. The sheath is configured as an airbag trunk via which gas flows into the chamber when the airbag is triggered.

The tensioning element is configured as an active tensioning resulting from the deployment of the chamber in such a way that, in advantageous fashion, an additional actuator is not needed for actuating the tensioning element. In a possible embodiment, the tensioning element is configured as a tensioning cable or a tensioning strap.

A possible development includes a brake for braking a displacement of the tensioning element in opposition to the tensioning direction is arranged in the zone of the passage opening. In a particularly advantageous fashion, the brake enables the tensioning element to be held in its tensioned position after an active tensioning brought about by inflation of the chamber. An additional, ongoing generation of a tensioning force by means of the chamber is therefore not required.

The airbag can, in particular, be used as a separating device (partition) or as an occupant protection device, which is automatically triggered in the event of an accident. To this end, the gas generator is controlled by a control unit which, for example, controls other occupant protection devices in the vehicle such as airbags and/or seatbelt tensioners.

According to the invention, a vehicle comprises such an airbag. For example, such an airbag as described in the preceding is arranged as a partition in a roof frame of the vehicle. As an alternative, the airbag can be a window airbag or an occupant protection device. By means of the airbag, a displacement and thus a tensioning function of the tensioning element can be effected in addition to a cushioning function resulting from the inflation for reducing the risk of injury or for tensioning a separation element or occupant protection element. A length of the displacement thus corresponds to a length of the invaginated portion of the chamber in the starting position. The displacement of the tensioning element and thus the tensioning force can be easily adjusted by selection of the length of the chamber and of the length of the invaginated tensioning bag.

BRIEF DESCRIPTION OF THE DRAWING FIGURES

Figure 2:
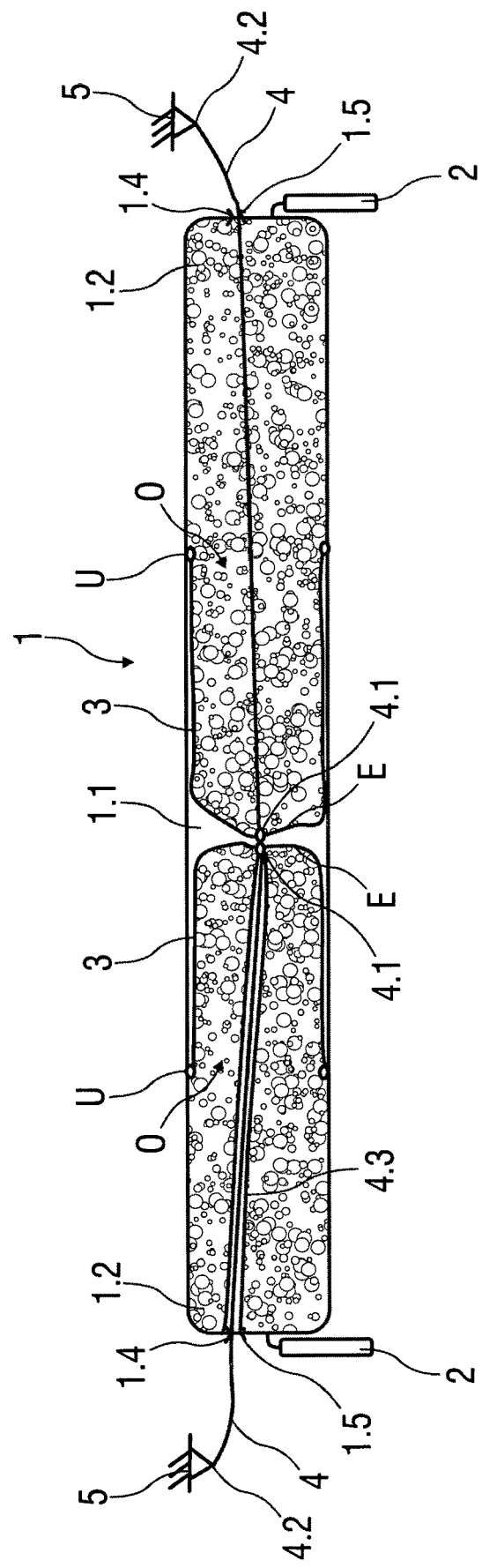
Figure 3:
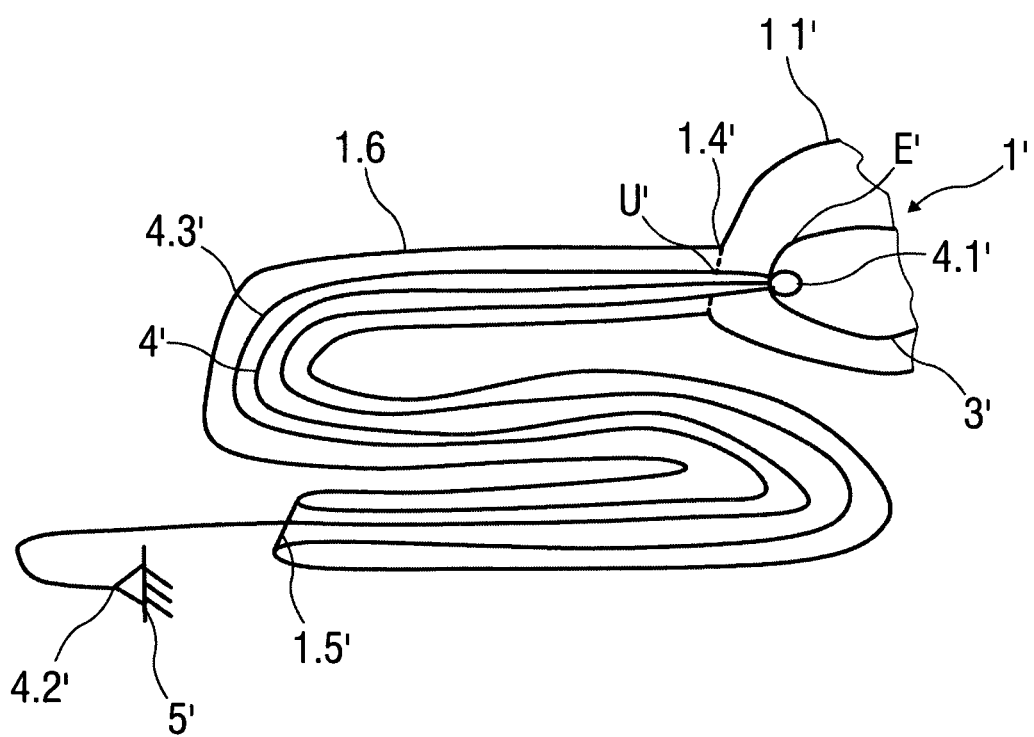
Figure 4:
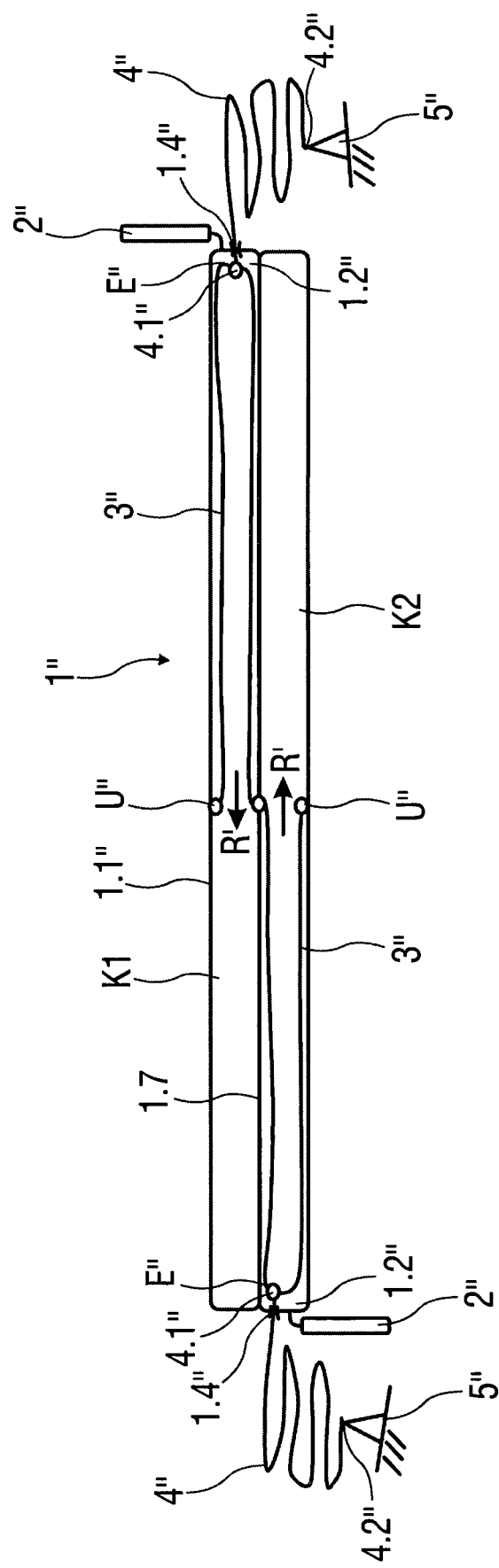
Figure 5:
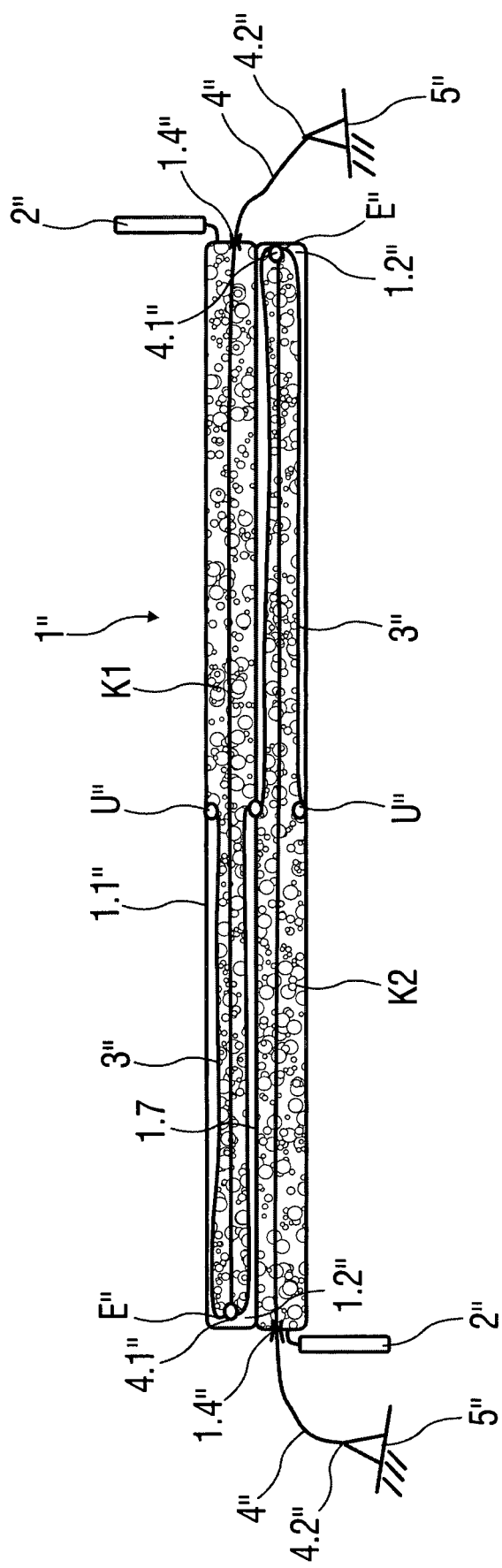

Exemplary embodiments of the invention are explained in more detail in the following with reference to drawings, wherein:

FIG. 1 schematically shows a sectional view of an airbag according to the invention in a starting position, FIG. 2 schematically shows a sectional view of the airbag according to FIG. 1 in a tensioning position, FIG. 3 schematically shows a section of an airbag in the zone of a passage opening for a tensioning element as well as a detailed depiction in a zone of the passage opening and of the tensioning element, FIG. 4 schematically shows a sectional view of another embodiment of an airbag according to the invention in a starting position, and FIG. 5 schematically shows a sectional view of the airbag according to FIG. 4 in a tensioning position.

In all figures, corresponding parts are designated by the same reference signs.

DETAILED DESCRIPTION

A sectional view of a possible exemplary embodiment of an airbag 1 according to the invention, in an unfilled starting position, is depicted in FIG. 1. FIG. 2 shows the airbag 1 in the filled state, i.e., in a tensioning position.

In the tensioning position, the airbag 1 in the depicted exemplary embodiment has a substantially circular cross section and an elongate cylindrical shape. However, the airbag 1 can also have another shape, such as a U-shape or L-shape, and/or another cross-sectional shape such as an oval or elliptical cross-sectional shape.

For example, the airbag 1 is arranged in a vehicle and serves to protect a person (e.g., a vehicle occupant) from injury in the event of a collision of the vehicle, or to trigger or deploy an occupant protection means, for example to activate a seat belt tensioner or to tension a separation element for a vehicle interior such as a luggage net and/or a partition.

The airbag 1 has an inflatable chamber 1.1. The chamber 1.1 has a longitudinally elongated hollow cylindrical shape. At each opposing chamber end 1.2, a respective gas generator 2 is fluidically connected to the chamber 1.1. The respective gas generator 2 is configured as, for example, a pyrotechnic gas generator, a cold gas generator, or a hybrid gas generator and is connected to the chamber 1.1 in a fluid-tight manner.

Two tensioning bags 3 are arranged in the chamber 1.1. Depending on the chamber shape, it is also possible for only one or a plurality of tensioning bags 3 to be arranged in the chamber 1.1. The tensioning bags 3 are made of a fluid-tight fabric and form inflatable inner airbags.

The two tensioning bags 3 are arranged in the chamber 1.1 opposite one another in the axial longitudinal alignment of the chamber 1.1. The tensioning bags 3 each have a bag opening O and a closed bag end E. The respective tensioning bag 3 is fastened in a fluid-tight manner to the chamber 1.1 by means of a peripheral seam U.

The respective tensioning bag 3 has dimensions corresponding to the dimensions of the chamber 1.1. In particular, the respective tensioning bag 3 has a length that corresponds to the length of the chamber 1.1. By virtue of the opposing arrangement of the tensioning bags 3 in the chamber 1.1, the tensioning bags 3 each have approximately a quarter of the length of the chamber 1.1. This reduces the tensioning paths of the tensioning bags 3 considerably.

In the unfilled state of the chamber 1.1, the tensioning bags 3 in the chamber 1.1, in a starting position, are invaginated toward the opposing chamber ends 1.2 into the chamber 1.1. A respective tensioning element 4 is guided, through a passage opening 1.4 situated at the respective chamber end 1.2, from an exterior of the chamber 1.1 into an interior of the chamber 1.1 and fastened with a tensioning element end 4.1 to the bag end E opposite the bag opening O of the associated invaginated tensioning bag 3.

The respective tensioning element 4 is fastened by the remaining and opposite tensioning element end 4.2 to a tensioning mount 5 that is fixedly positioned relative to the airbag 1, for example to a vehicle component, in particular to a vehicle body, for instance to an A pillar, B pillar, C pillar, or to a vehicle seat.

In the depicted exemplary embodiment, the tensioning element 4 is a tensioning cable. In exemplary embodiments not depicted in any further detail, the tensioning element 4 can be a tensioning belt.

When the airbag 1 is triggered, the chamber 1.1 can be filled from both chamber ends 1.2 with the gas in such a way that after filling, both tensioning bags 3, which are invaginated in the starting position, are synchronously evaginated, starting from their starting positions into the tensioning position, from each associated chamber portion. During the evagination process, the respective tensioning element 4 moves through the passage opening 1.4 in a tensioning direction R (see arrow) through the chamber 1.1.

A portion of the respective tensioning element 4, which portion is located outside the chamber 1.1 in the starting position thereof, shortens by a length of the tensioning bag 3 invaginated in the starting position, wherein the portion situated outside is pulled completely into the interior of the chamber 1.1 during the deployment process, in order to generate a tensioning therein. In other words, a length of the displacement and/or a tensioning path of the tensioning element 4 corresponds to a length of the tensioning bag 3 invaginated in the starting position. The tensioning path of the respective tensioning element 4 can thus be pre-specified by the length of the associated, invaginated tensioning bag 3. The displacement of the respective tensioning element 4 and thus the tensioning force are thus easily adjustable by selection of the length of the chamber 1.1 and the length of the associated, invaginated tensioning bag 3.

In detail, when the at least two gas generators 2 are activated, the chamber 1.1 is filled at both chamber ends 1.2 with gas and deploys until reaching the tensioning position. For example, the gas generator 2 is connected to a (not shown) airbag control device, by means of which the gas generators 2 can be synchronously, in particular substantially simultaneously, actuated in the event of, say, a detected imminent collision of the vehicle or in the event of a detected collision of the vehicle.

When using the airbag 1 in a vehicle, for example, the tensioning mount 5 is arranged in a vehicle-fixed manner, wherein a predefined positioning and/or fixation of the chamber 1.1 in the vehicle can take place due to the tensioning of the tensioning element 4. In particular, it is possible to position the chamber 1.1 of the airbag 1 in a different position inside the vehicle in its deployed use state than in its non-use state.

As an alternative, the tensioning mount 5 is arranged on another not illustrated component that is intended to be displaced or tensioned. For example, the latter is a component of a seat belt of the vehicle for tensioning a strap of the seat belt so that when the airbag 1 is triggered, the seat belt can be tensioned by means of the tensioning element 4 simultaneously and without any additional, separate belt tensioners. A section of the belt strap of the seat belt can form the tensioning element 4.

To prevent or at least reduce the escape of the filled gas from the chamber 1.1 and to maintain a pressure generated inside the chamber 1.1 during the filling, the airbag 1 has in the vicinity of the respective passage opening 1.4 a fluid-tight tensioning element bushing 1.5, which is guided around the associated tensioning element 4 in such a way that the passage opening 1.4 corresponds to a cross section of the tensioning element 4.

In order to maintain the tensioning of the respective tensioning element 4 even when the chamber 1.1 becomes flaccid, in the vicinity of the passage opening 1.4 the tensioning element bushing 1.5 is configured as a brake or retraction arrest for braking a movement of the tensioning element 4 running in a direction contrary to the tensioning direction R. The brake is thus configured as a passive element, in particular in such a way that it automatically holds the tensioning element 4 and prevents or at least impedes the movement of the tensioning element 4 contrary to the tensioning direction R.

The respective fluid-tight tensioning element bushing 1.5 can be configured as a circumferential lip seal, for example. An opening surrounded by the lip seal is configured in such a way that the lip seal forms a fluid-tight contact with the perimeter of the tensioning element 4 configured as a tensioning cable. In the embodiment of the tensioning element 4 as a tensioning belt, the lip seal is configured in such a way that it completely surrounds the tensioning belt in a fluid-tight manner. In a possible embodiment, the lip seal can be configured as mechanically flexible, wherein in the non-introduced state of the tensioning element 4, the opening surrounded by the lip seal is smaller than the cross section of the tensioning element 4.

For example, the respective tensioning element 4 is configured as a so-called beaded string or as a so-called her-ringbone string, the latter being a woven string in which the individual strands are interwoven in a V-shaped pattern. To create the brake, the latter has in the inside, at least in sections, a surface structure that corresponds to the beads or V-shaped strands of the tensioning element 4 in order to prevent or at least impede the movement of the tensioning element 4 in a direction contrary to the tensioning direction R.

As shown in FIG. 2, due to the fluid-tight peripheral seam U by which the tensioning bags 3 are fastened internally in the chamber 1.1, the chamber 1.1 can only be filled with gas at the chamber end 1.2 and in the vicinity of the tensioning bags 3. The portion of the chamber 1.1 between the evaginated and gas-filled tensioning bags 3 is free of gas.

FIG. 2 shows two alternative embodiments for the guiding of the tensioning element 4 in the chamber 1.1, specifically a direct one without a sheath and an indirect one with a sheath 4.3.

FIG. 3 shows schematically a section of an alternative airbag 1' in the vicinity of an alternative passage opening 1.4' for a tensioning element 4'. This embodiment dispenses with the tensioning element bushing 1.5 configured as a brake or retraction arrest for the tensioning element 4' in the passage opening 1.4' of the chamber 1.1'. A bag trunk 1.6 connects to the passage opening 1.4'. The bag trunk 1.6 is fastened in the passage opening 1.4' in a fluid-tight manner to the chamber 1.1' by means of a peripheral seam U'.

This embodiment is intended for an airbag 1' whose gas generator 2' is arranged remotely from the chamber 1.1' so that the gas is supplied to the interior of the chamber 1.1' via the bag trunk 1.6. In this embodiment, the tensioning element bushing 1.5' is arranged on the end of the bag trunk 1.6 that is remote from the chamber 1.1'.

As already shown in FIG. 2, the tensioning element 4' is guided in a sheath 4.3'. The tensioning element 4' is fastened to the chamber at the bag end E' of the tensioning bag 3', in a manner analogous to the preceding exemplary embodiment. It is fastened to the vehicle on the tensioning mount 5'.

FIGS. 4 and 5 schematically show a sectional view of another embodiment of an airbag 1" according to the invention in a starting position and in a tensioning position, respectively. This embodiment, which is described in the following, is used in particular with tall or wide airbags 1".

In this exemplary embodiment, the chamber 1.1" is configured as a double chamber and divided by an inner wall 1.7 into at least two approximately equal-sized chamber portions K1, K2. Depending on the intended use and size of the airbag 1", the chamber 1.1" can also be subdivided into different-sized chamber portions K1, K2 and multiply subdivided. In the exemplary embodiment, the chamber portions K1, K2 are arranged in parallel over one another and extend substantially over the entire longitudinal extension of the airbag 1".

For filling the chamber portions K1, K2, the airbag 1" and thus the double chamber has a respective gas generator 2" at each opposite chamber end 1.2". Thus, only one gas generator 2" is assigned to each chamber portion K1, K2. In other words, the two chamber portions K1, K2 arranged in parallel over one another are filled synchronously, in particular simultaneously, from the opposing chamber ends 1.2" with gas when the airbag 1" is triggered.

An associated tensioning bag 3" is arranged in each of the chamber portions K1, K2. The tensioning bags 3" have a length that corresponds to approximately half the length of the chamber 1.1". The tensioning bags 3" are fastened with a peripheral seam U" in a fluid-tight manner in the center of the respective chamber portion K1, K2. The tensioning path is double that of the one in the exemplary embodiment according to FIGS. 1 and 2.

In a manner analogous to the exemplary embodiment according to FIGS. 1 and 2, in the starting position, the tensioning bags 3" are invaginated in the associated chamber portion K1, K2. A bag side tensioning element end 4.1" is fastened to the bag end E" in each case. The opposite tensioning element end 4.2" is fastened to a tensioning mount 5".

When the airbag 1" is triggered, the chamber 1.1" can be filled with the gas from both chamber ends 1.2" in such a way that after filling, both tensioning bags 3", which are invaginated in the starting position, are synchronously evaginated from their starting positions and deployed and tensioned in tensioning positions in each respective, associated chamber portion K1, K2. During the evagination process, the respective tensioning element 4" moves through the passage opening 1.4" in a tensioning direction R' (see arrow) through the chamber 1.1.

A portion of the respective tensioning element 4" that is located outside the chamber 1.1 in the starting position of the latter shortens by a length of the tensioning bag 3" invaginated in the starting position, wherein the externally situated portion is pulled entirely into the interior of the chamber 1.1" during the deployment thereof in order to generate tension. In other words, a length of the displacement and/or a tensioning path of the tensioning element 4" corresponds to a length of the tensioning bag 3" invaginated in the starting position. The tensioning path of the respective tensioning element 4" can thus be predefined by means of the length of the associated, invaginated tensioning bag 3".

In the filled and hence tensioned state of the tensioning bags 3" in the respective chamber portion K1, K2 and thus of the airbag 1", the tensioning bags 3" are arranged in parallel over one another.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle airbag, comprising:
    at least one chamber configured to be inflated when the airbag is triggered;
    at least one gas generator fluidically connected to the at least one chamber and configured to fill the at least one chamber with a gas; and
    a first and second interior tensioning bag respectively arranged in the at least one chamber at each opposing chamber end, wherein the first and second interior tensioning bags are configured in such that during the filling of the at least one chamber, the first and second interior tensioning bags synchronously tension and deploy the chamber,
    wherein in an unfilled state of the at least one chamber, the first and second interior tensioning bags are invaginated in a starting position in the at least one chamber, and the at least one chamber is fillable with the gas in such a way that the first and second interior tensioning bags, which are invaginated in the starting position, are evaginated from the starting position into a tensioning position inside the at least one chamber after filling, and
    wherein, for each of the first and second interior tensioning bags, at least one associated tensioning element is guided through a passage opening from an exterior of the at least one chamber into an interior of the at least one chamber and fastened at a bag end opposite a bag opening of the respective invaginated interior tensioning bag, wherein the tensioning elements respectively tension the first and second interior tensioning bags through the respective passage opening in opposing tensioning directions.

2. The airbag of claim 1, wherein in a filled state of the at least one chamber, the evaginated first and second interior tensioning bags are adjacent to one another in the at least one chamber.

3. The airbag of claim 2, wherein in the filled state of the at least one chamber, the bag ends of the evaginated first and second interior tensioning bags are adjacent to one another.

4. The airbag of claim 1, wherein in the filled state of the chamber, the evaginated first and second interior tensioning bags are arranged in parallel over one another.

5. The airbag of claim 1, wherein the first and second interior tensioning bags are fastened to the chamber and fluidically connected to the chamber by a respective peripheral seam.

6. A vehicle airbag, comprising:
    at least one chamber configured to be inflated when the airbag is triggered;
    at least one gas generator fluidically connected to the at least one chamber and configured to fill the at least one chamber with a gas; and
    a first and second interior tensioning bag respectively arranged in the at least one chamber at each opposing chamber end, wherein the first and second interior tensioning bags are configured in such that during the filling of the at least one chamber, the first and second interior tensioning bags synchronously tension and deploy the chamber, wherein a bag trunk, in which a tensioning element for the first and second interior tensioning bags is guided, is arranged on the chamber.

7. The airbag of claim 6, wherein the tensioning element is a tensioning cable or a tensioning belt.

8. A method for deploying a vehicle airbag, the method comprising:
    filling, by a first gas generator, at least one chamber with a gas;
    filling, by a second gas generator, the at least one chamber with gas,
    wherein a first and second interior tensioning bag, respectively arranged in the at least one chamber at each opposing chamber end, synchronously tension and deploy the chamber during the filling of the at least one chamber by the first and second gas generators,
    wherein in an unfilled state of the at least one chamber, the first and second interior tensioning bags are invaginated in a starting position in the at least one chamber, and the at least one chamber is filled with the gas in such a way that the first and second interior tensioning bags, which are invaginated in the starting position, are evaginated from the starting position into a tensioning position inside the at least one chamber after filling, the method further comprising tensioning, by respective tensioning elements, the first and second interior tensioning bags, wherein the respective tensioning elements are guided through a passage opening from an exterior of the at least one chamber into an interior of the at least one chamber and fastened at a bag end opposite a bag opening of the respective invaginated interior tensioning bag, wherein the tensioning elements respectively tension the first and second interior tensioning bags through the respective passage opening in opposing tensioning directions.

* * * * *